United States Patent
Tabor

(10) Patent No.: US 10,794,513 B2
(45) Date of Patent: Oct. 6, 2020

(54) OVERLOAD PROTECTION VALVE

(71) Applicant: LOON LLC, Mountain View, CA (US)

(72) Inventor: Mathew Tabor, San Francisco, CA (US)

(73) Assignee: Loon LLC, Mountain View, CA (US)

( * ) Notice: Subject to any disclaimer, the term of this patent is extended or adjusted under 35 U.S.C. 154(b) by 224 days.

(21) Appl. No.: 15/910,198

(22) Filed: Mar. 2, 2018

(65) Prior Publication Data

US 2019/0271408 A1 Sep. 5, 2019

(51) Int. Cl.
| F16K 31/56 | (2006.01) |
| F16K 31/524 | (2006.01) |
| F16K 5/04 | (2006.01) |
| B66C 15/00 | (2006.01) |

(52) U.S. Cl.
CPC ............ *F16K 31/563* (2013.01); *B66C 15/00* (2013.01); *F16K 5/04* (2013.01); *F16K 31/52458* (2013.01)

(58) Field of Classification Search
CPC ............. F16K 31/563; F16K 31/52458; F16K 31/5286; F16K 31/528; F16K 31/5247; F16K 5/04; F16K 3/26; F16K 13/00; F16K 31/52475; B66C 15/00; B66C 23/88
USPC .................................................... 251/74, 72
See application file for complete search history.

(56) References Cited

U.S. PATENT DOCUMENTS

| 3,205,863 A | 9/1965 | Kent |
| 3,298,481 A | 1/1967 | Schaedler et al. |
| 3,385,377 A | 5/1968 | Amtsberg et al. |
| 4,187,763 A | 2/1980 | Nanda |
| 4,221,238 A * | 9/1980 | Madsen ................ F16K 31/528 137/627.5 |
| 4,585,369 A * | 4/1986 | Manesse ............... B63B 21/502 403/322.3 |

(Continued)

FOREIGN PATENT DOCUMENTS

| JP | 56024274 A | 3/1981 |
| JP | 08158840 A | 6/1996 |

(Continued)

OTHER PUBLICATIONS

Quora, https://www.quora.com/How-does-a-click-pen-work, downloaded Jan. 30, 2018 (8 pgs.).

(Continued)

*Primary Examiner* — Craig J Price
*Assistant Examiner* — Andrew J Rost
(74) *Attorney, Agent, or Firm* — Botos Churchill IP Law

(57) ABSTRACT

Aspects of the disclosure relate to an overload protection valve for automatic release of a load. The valve may include an outer housing having an end wall, a cam, and inner slide, and an overload spring. The inner slide may include a side wall, a shelf area, an internal barrier, an inlet and an outlet. Each of the inlet and outlet may include an opening through the side wall, and the inlet and the outlet may be separated by the internal barrier. The overload spring may be arranged between the end wall and the shelf area, and may define a load on the valve which will cause the valve to open. The cam may be configured such that when the valve is closed, the defined load will cause the cam to rotate thereby allowing the openings of the inlet and outlet to be in fluid communication and open the valve.

19 Claims, 11 Drawing Sheets

(56) References Cited

U.S. PATENT DOCUMENTS

| | | | | |
|---|---|---|---|---|
| 4,632,361 A | * | 12/1986 | Callison | A01G 25/165 137/624.14 |
| 5,531,408 A | | 7/1996 | Wechselberger | |
| 8,272,445 B2 | * | 9/2012 | Fay | E21B 23/006 137/625.48 |

FOREIGN PATENT DOCUMENTS

| | | | |
|---|---|---|---|
| JP | 2010208192 A | 9/2010 | |
| KR | 100499285 B1 | 7/2006 | |

OTHER PUBLICATIONS

International Search Report and Written Opinion for Application No. PCT/US2019/019971.

* cited by examiner

INLET END

OVERLOAD PROTECTION VALVE

BACKGROUND

Various systems, such as cranes, towing machines, and other devices, employ grabbing mechanisms to grab, hold, lift, and move objects. These mechanisms may include hooks, pneumatically operated claws or grabbers, etc. In some instances, the load of an object that these being moved may be greater than what the system is able to effectively or safely move. As such, the system may fail which can potentially cause damage or injury to the system, the object, other nearby objects, as well as any human operators.

BRIEF SUMMARY

Aspects of the present disclosure provide a system including an overload protection valve. The valve includes an outer housing having an end wall;—a cam arranged at least partially within the outer housing; an inner slide including a side wall, a shelf area, an internal barrier, an inlet and an outlet, each of the inlet and outlet including an opening through the side wall, the inlet and the outlet being separated by the internal barrier; and—an overload spring arranged between the end wall and the shelf area configured to define a load on the valve which will cause the valve to open. In addition, the cam is configured such that when the valve is closed, the defined load on the valve will cause the cam to rotate in order to allow the openings of the inlet and outlet to be in fluid communication with one another and open the valve.

In one example, the system also includes a cam pin extending from an interior surface of the cam. In this example, the cam pin extends into a slot of the inner slide. In addition, the slot includes first and second slot portions arranged at an angle of 90 degrees or less from one another. In addition or alternatively, the cam pin is configured to move within the slot of the inner slide when the defined load is attached to the overload protection valve. In another example, the system also includes an inner slide pin extending from an exterior surface of the inner slide. In this example, the inner slide pin extends into a slot of the cam. In addition or alternatively, the inner slide pin is configured to move within the slot of the inner slide when the defined load is attached to the overload protection valve and causes the cam to rotate. In another example, the cam includes at least three grooves on an interior surface of the cam. In this example, each of the grooves includes a sealing O-ring. In addition, each sealing O-ring is arranged around the inner slide. In addition, a first pair of the sealing O-rings form a first compartment between the inner slide and the cam, and a second pair of the sealing O-rings forms a second compartment between the inner slide and the cam. In addition, the valve is closed the opening of the inlet is in fluid communication with the first compartment. In addition, the valve is closed the opening of the outlet is in fluid communication with the second compartment. In addition, when the valve is open, the openings of the inlet and the outlet are in fluid communication with the second compartment. In another example, the system also includes a cam actuation spring arranged around the inner slide and configured to provide a pushing force on the cam. In another example, the system also includes a pressurized fluid source configured to provide fluid to the overload protection valve. In this example, the system also includes a grabbing mechanism, and when the overload protection valve is open, the fluid is able to pass to the grabbing mechanism. In addition, the grabbing mechanism is configured to automatically release the defined load when the fluid passes to the grabbing mechanism. In addition, the system also includes the defined load.

DETAILED DESCRIPTION

Figure 1:
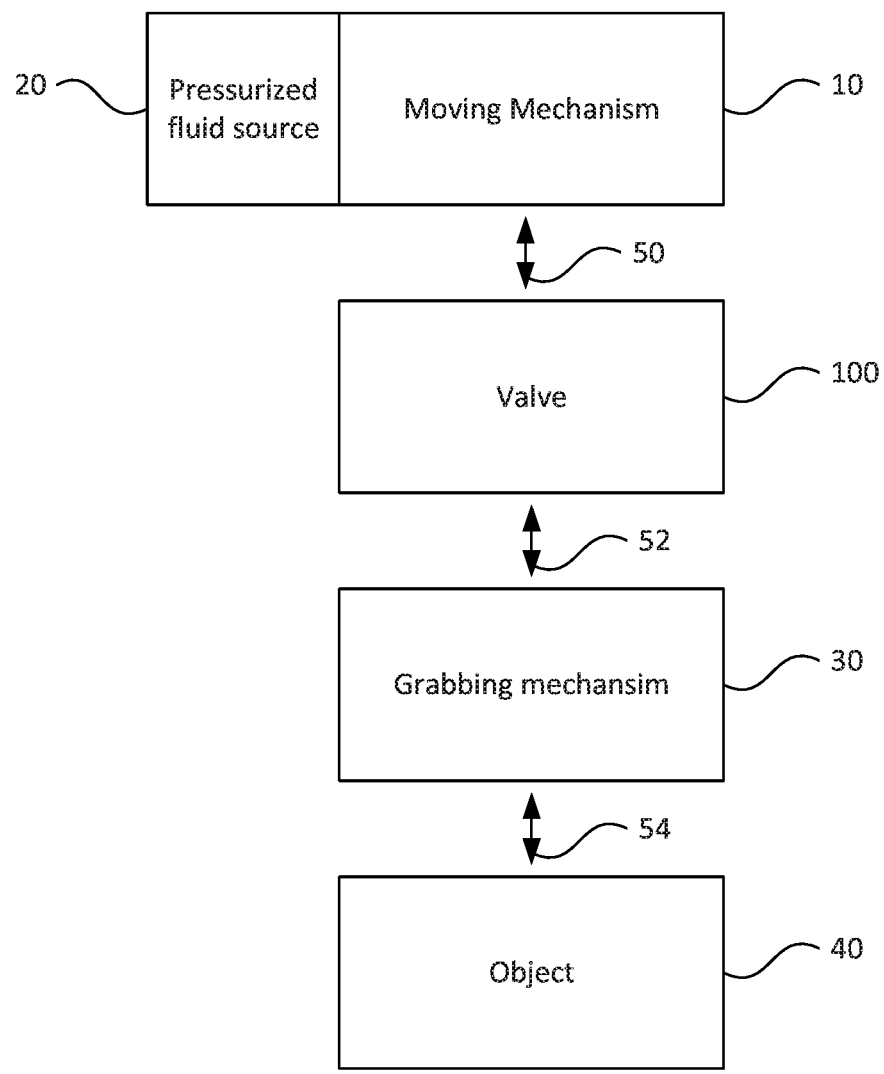
FIG. 1 is a functional diagram of a system in accordance with aspects of the present disclosure.

The technology relates to mechanisms to allow a system to automatically release a load in order to prevent reduce a likelihood of damage to the system, and in some cases, catastrophic damage in an unforeseen loading scenario. For instance, where a crane is used to lift an object, and the crane would be unable to support the weight of the object, a valve may be used to automatically release the object while the object is being initially lifted by the crane. In some cases, the crane may be able to support the weight of an object, but if there is a sudden wind event or other unpredicted high load scenario, rather than pulling down the entire crane, the valve may fire at a predetermined load and automatically release the object, thereby preventing catastrophic failure. Similar situations may occur in systems that are used to pull, as opposed to push, objects, such as towing mechanisms. In such situations, the valve may again fire if the load is too great, releasing the object and avoiding damage to the features of the system.

An example system may include a moving mechanism, connected to a grabbing mechanism which together can be used to lift, pull, or otherwise move a load or object. An overload protection valve may be arranged between the moving mechanism and the grabbing mechanism to prevent the moving mechanism from lifting or pulling an object greater than a predetermined weight and avoid damage to the object, grabbing mechanism and even the lifting mechanism.

The moving mechanism may include a device that can be used to move and release objects. The moving mechanism may be attached to or include a pressurized fluid source or other device which can provide pressurized fluid to the valve. The grabbing mechanism may include any type of grabbing mechanism capable of automatically releasing the object pneumatically or hydraulically.

The valve may include an outer housing, a cam, a cam actuation spring, an overload spring, and an inner slide. The inner slide may include an outlet end including an outlet and an inlet end including an inlet. The inlet end may be attached to the moving mechanism and in fluid communication with the air source, and the outlet end may be in fluid communication with the grabbing mechanism. The inlet and outlet may be separated by an internal wall prevents fluid from passing directly between the inlet the outlet. In addition each of the inlet and the outlet include respective openings that extend completely through an outer wall of the inner slide.

The inner slide may also include a shelf area arranged between the cam actuation spring and the overload spring. The overload spring may be sized according to the predetermined load selected for automatically opening the valve. The cam actuation spring may be arranged between the shelf area and the cam. As such, the cam actuating spring may be sized in order to provide a sufficient pushing force on the cam to move the cam in order to unlock or open the valve.

The outer housing may include an end wall. Together the shelf area and the end wall may define a space for the overload spring. As such, during loading, both the end wall and the shelf area may provide a compression force on the overload spring as the shelf area is pulled towards the end wall.

The cam may include a plurality of grooves on an interior surface of the cam. Each groove may include a respective seal sized to provide an air and fluid tight barrier between the cam and the inner slide during typical or expected operating temperature configurations for the valve. Together, the seals and grooves together may form first and second compartments between the cam and the inner slide.

When the valve is in the closed or locked configuration, the first compartment may be in fluid communication with the first opening in the inlet and the second compartment may be in fluid communication with the second opening in the outlet. When the valve is in the unlocked or open configuration, the second compartment may be in fluid communication with both the first opening and the second opening.

Each of the cam and the inner slide may include a respective pin and a respective slot. The cam pin may extend into the slot of the inner slide, and an inner slide pin may extend into the slot of the cam. The shape of each slot defines the path of the corresponding pin in that slot.

During loading, when the grabbing mechanism is attached to a load or object and the moving mechanism begins attempt to move the object, the object will provide a pulling/resistance force at the outlet end of the inner slide. As the inner slide is pulled towards the object, the inner slide pin may move within and follow the shape of the first slot portion of the slot of the cam. The overload spring may slow or limit this movement of the inner slide pin within the slot of the cam.

The movement of the inner slide pin within and along the first slot portion of the slot of the cam may cause the cam to rotate. This rotation of the cam may cause the cam pin to slide within the first slot portion of the slot of the inner slide. Eventually, the cam pin and inner slide pin may align with the second slot portions of the slots of the inner slide and cam, respectively. At this point, the pulling/resistance of the object will pull the inner slide pin along the second slot portion of the slot of the cam. At the same time, the cam actuation spring will expand and push the cam away from the shelf area causing the cam pin to move along the second slot portion 756 of the slot of the inner slide.

Movement of the cam away from the object will reposition the seals and relative to the inner slide such that the first and second openings will each be within the second compartment thereby unlocking the valve and allowing fluid to pass from the inlet to the outlet. In this configuration, fluid from the fluid source may then pass to the grabbing mechanism causing the grabbing mechanism to automatically release the object, pneumatically or hydraulically.

The features described above provide for predictive failure of a system configured to lift, pull, or otherwise move a load. In other words, the system is able to fail in a controlled, safe way, rather than in a dangerous way. In addition, the size and configuration of the overload spring may define exactly how much weight will cause the valve to open making the valve functional for any number of different situations, systems and objects. In addition, the valve described herein may be employed in any pneumatic or hydraulic lifting, holding, and/or moving application as an overload prevention device. As noted above, the valve may be configured not only to protect the object, but also to protect the moving mechanism. When the valve is pulled in tension, at a certain load the valve is opened, providing gas, air, or fluid to the downstream pneumatic or hydraulic line. This opening happens very quickly, as to enable fast release of pressure and thus emergency release of the load.

Aspects, features and advantages of the disclosure will be appreciated when considered with reference to the foregoing description of embodiments and accompanying figures. The same reference numbers in different drawings may identify the same or similar elements. Furthermore, the following description is not limiting; the scope of the present technology is defined by the appended claims and equivalents.

FIG. 1 includes an example system 1 including a moving mechanism 10, connected to a grabbing mechanism 30 which together can be used to lift (vertically), pull (horizontally), or otherwise move a load or object 40. An overload protection valve 100 may be arranged between the moving mechanism 10 and the grabbing mechanism 30 to prevent the moving mechanism from lifting or pulling an object greater than a predetermined load (weight or resistance force) and avoid damage to the object 40, grabbing mechanism, the lifting mechanism, and even any objects or human operators proximate to the system 1. The arrows 50, 52, 54 each represent mechanical connections between the moving mechanism 10 and the valve 100, between the valve and the grabbing mechanism 30, and between the grabbing mechanism 30 and the object 30, respectively, as discussed in further detail below. This example should not be considered as limiting the scope of the disclosure or usefulness of the features described herein.

The moving mechanism 10 may include a tool (such as a handheld or larger device), a machine for towing (such as a car, truck, or train), or other device that can be used to move and release objects such as robotic arms, assembly machine parts, construction equipment, sorting machines, pick and place robots, various types of cranes, including gantry cranes and jib cranes, etc. The moving mechanism 10 may be attached to or include a pressurized fluid source 20 such as an air source, compressor, or other device which can provide pressurized fluid (air or gas) to the valve.

The grabbing mechanism 30 may include any type of grabbing mechanism capable of automatically releasing the object pneumatically or hydraulically. For instance, the grabbing mechanism may include a hook, claw, grabbers, tow or other hitch, etc. that can grab the object and when supplied with pressurized fluid (such as air or gas) will automatically release the object.

Figure 2:
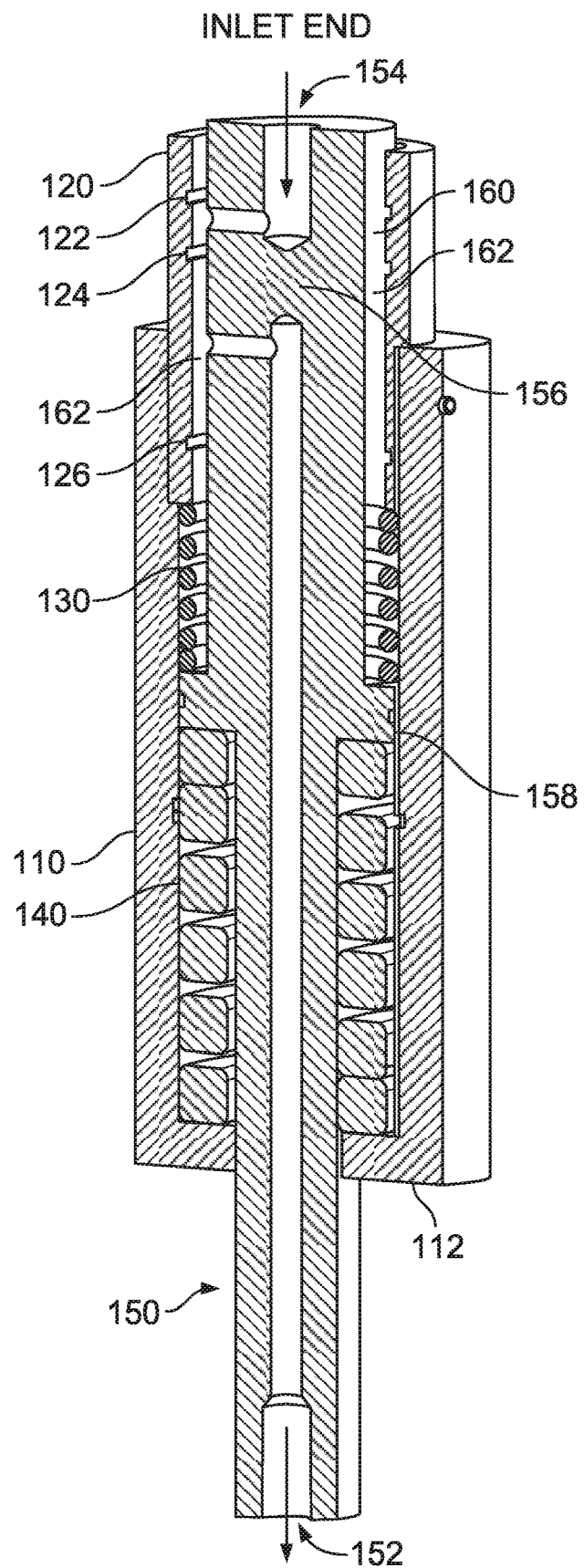
FIG. 2 is a cross-sectional view of an overload protection valve in accordance with aspects of the disclosure.
Figure 3:
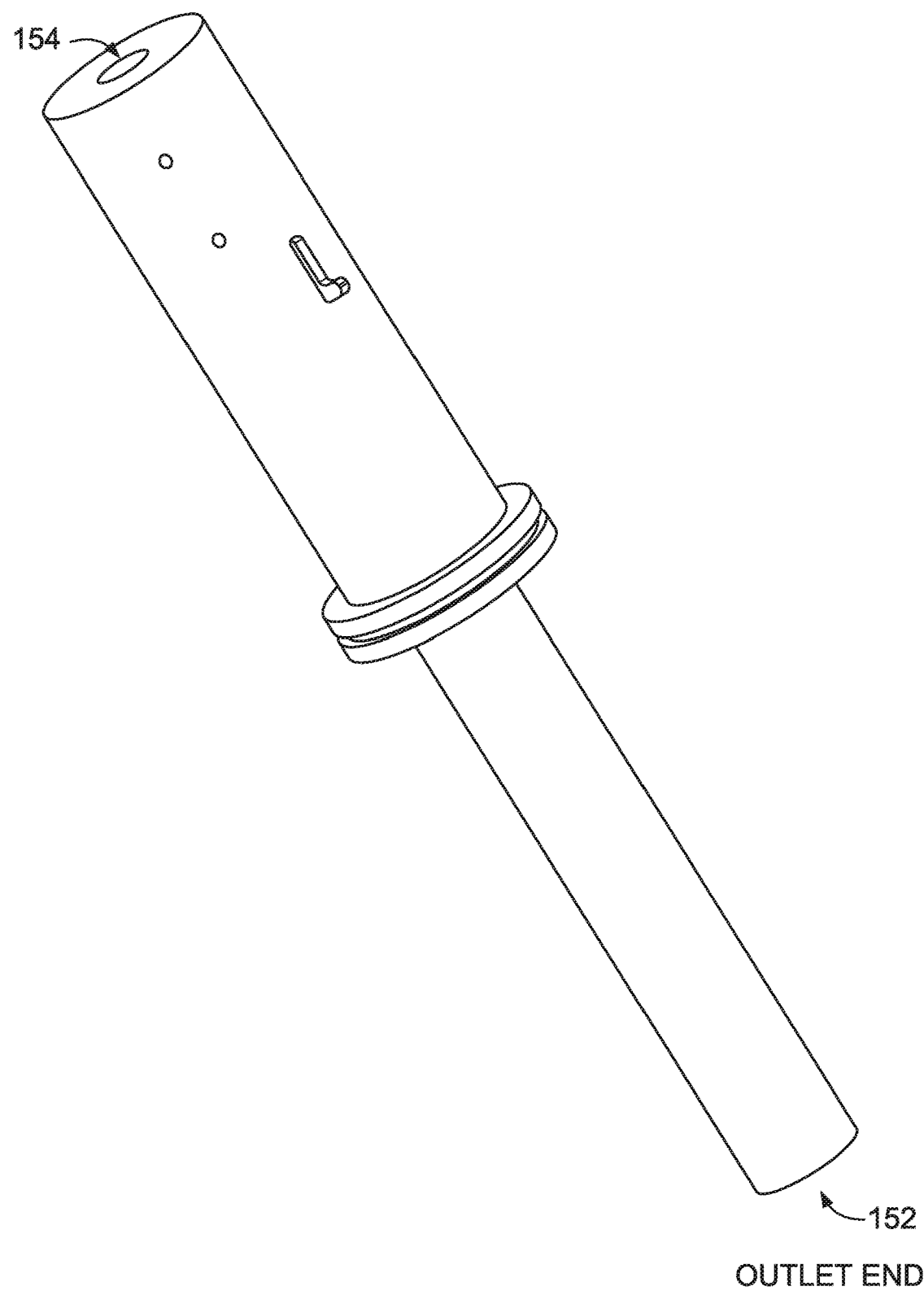
FIG. 3 is a perspective view of an inner slide in accordance with aspects of the disclosure.
Figure 4:
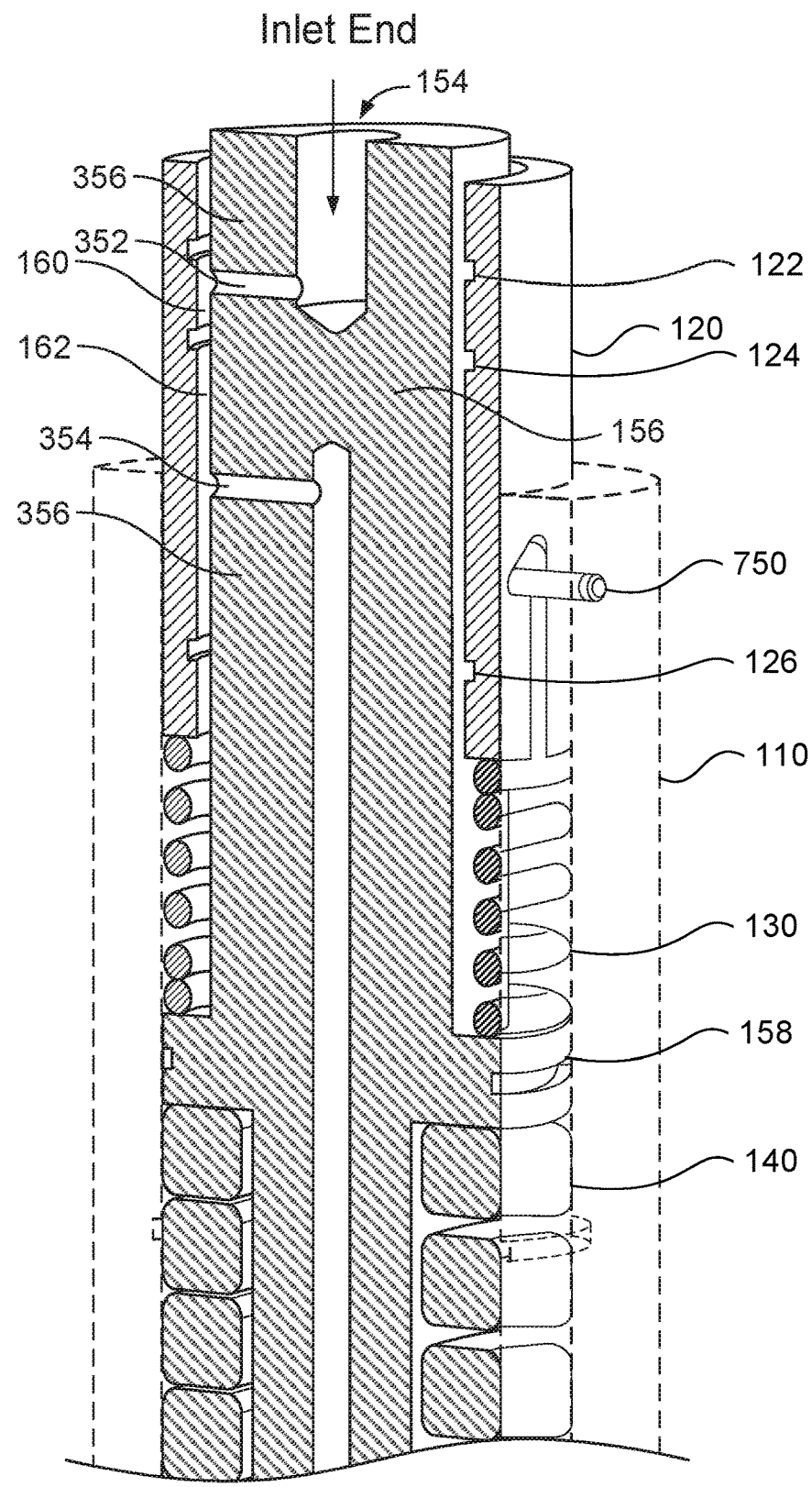
FIG. 4 is partial a cross-sectional view of an overload protection valve in accordance with aspects of the disclosure.

As shown in the cross-sectional perspective view of FIG. 2, the valve 100 may include an outer housing 110, a cam 120, a cam actuation spring 130, an overload spring 140, and an inner slide 150. FIG. 3 is a perspective view of the inner slide 150, and FIG. 4 is a cross-sectional partial perspective view of the valve 100 with the outer housing 110 being depicted as transparent (dashed line) for ease of viewing and understanding.

The inner slide 150 includes an outlet end including an outlet 152 and an inlet end including an inlet 154. The inlet end may be attached to the moving mechanism and in fluid communication with the pressurized fluid source 20, and the outlet end may be in fluid communication with the grabbing mechanism. These connections may include, for instance, bolts and/or other mechanical connections such as pins, threading, etc. The inlet 154 and the outlet 152 are separated by an internal barrier or wall 156 which prevents fluid from passing directly between the inlet the outlet. In addition each of the inlet 154 and the outlet 152 include respective openings, corresponding to first and second openings 352, 354 that extend completely through an outer wall 356 of the inner slide.

The inner slide 150 also includes a shelf area 158 arranged between the cam actuation spring 130 and the overload spring 140. The overload spring 140 may be arranged around the inner slide 150 and may be sized according to the predetermined load selected for automatically opening the valve 100 as discussed further below. The shelf area 158 may also provide support for the cam actuation spring 130. The cam actuation spring 130 is arranged between the shelf area 158 and the cam 120 and around the inner slide 150. As such, the cam actuating spring 130 may be sized in order to provide a sufficient pushing force on the cam 120 to move the cam in order to open or unlock the valve 100.

The outer housing 110 may include an end wall 112. Together the shelf area 158 and the end wall 112 define a space for the overload spring 140. As such, during loading, both the end wall 112 and the shelf area 158 may provide a compression force on the overload spring 140 as the shelf area 158 is pulled towards the end wall 112.

Figure 5A:
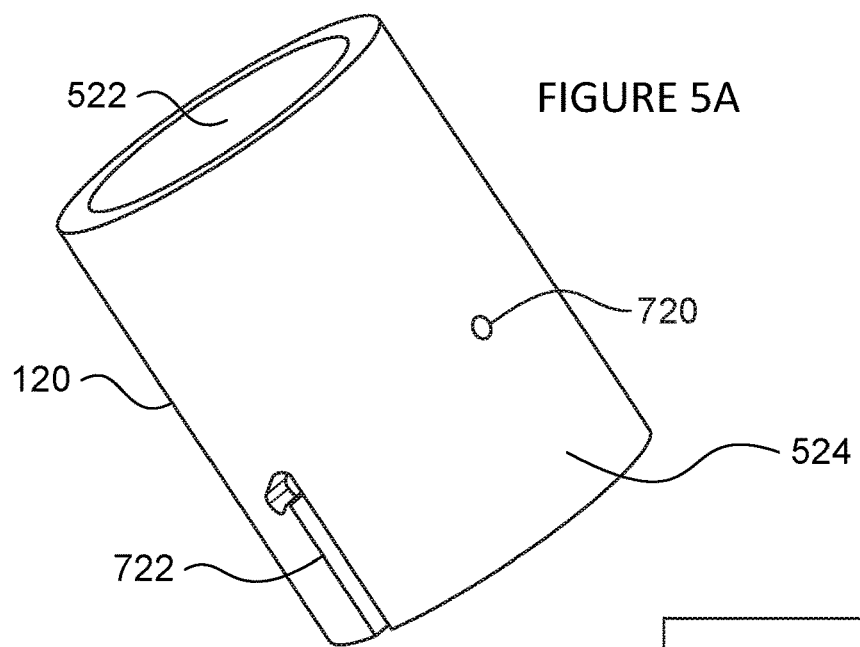
FIG. 5A is a perspective view of a cam in accordance with aspects of the disclosure.
Figure 5B:
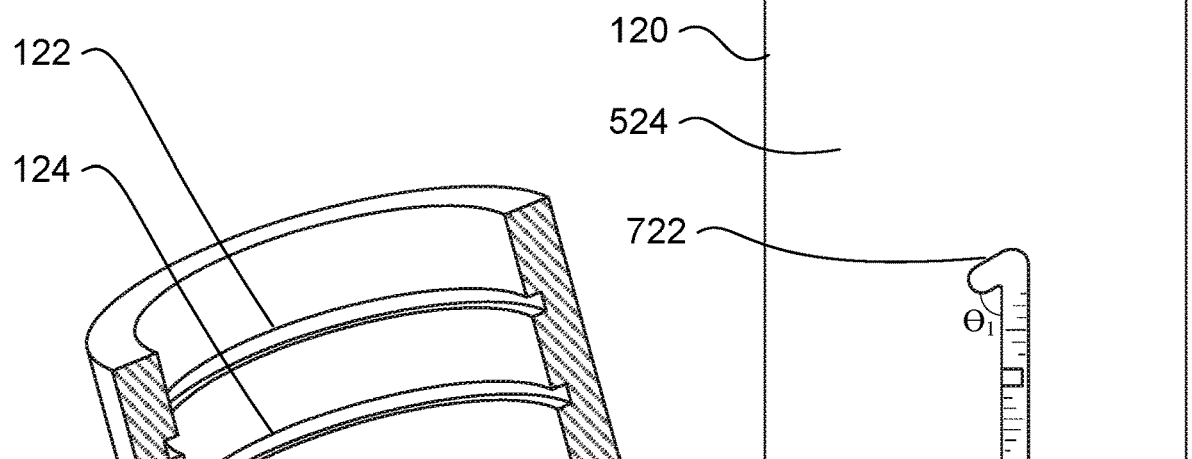
FIG. 5B is a perspective view of a cam in accordance with aspects of the disclosure.
Figure 5C:
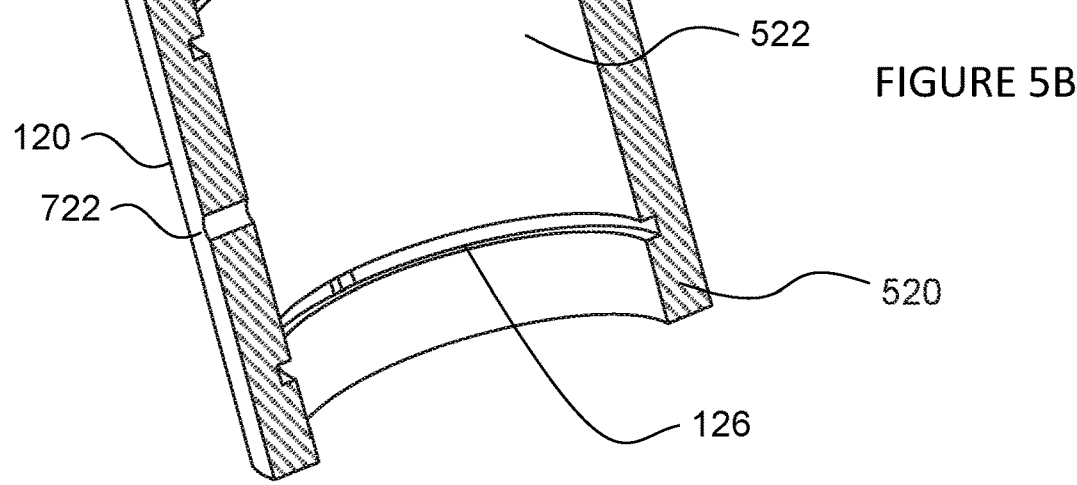
FIG. 5C is a cross-sectional view of a cam in accordance with aspects of the disclosure.

FIGS. 5A, 5B, and 5C are perspective, side, and cross-sectional views of the cam 120. The cam includes a side wall 520 including an inward facing interior surface 522 and an outward facing exterior surface 524. The cam 120 may include a plurality of grooves 122, 124, 126 on the interior surface 522. As the cam 120 has a cylindrical shape, each of the grooves may be annular grooves that extend 360 degrees around the interior surface 522.

Figure 6:
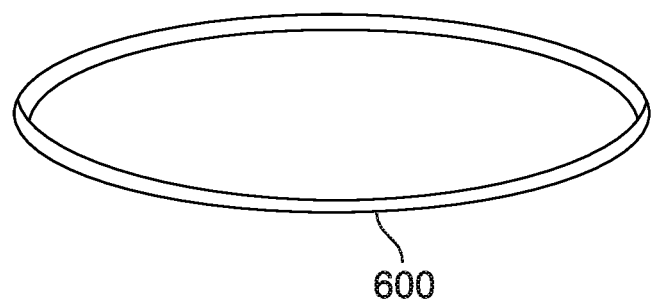
FIG. 6 is a perspective view of a ring in accordance with aspects of the disclosure.

In addition, each groove 122, 124, 126 may include a respective seal. FIG. 6 is a perspective view of an example seal 600. Seal 600 may be a sealing O-ring made of rubber, plastics, silicone, etc. and sized to provide an air and fluid tight barrier between the cam and the inner slide during typical or expected operating temperature configurations for the valve.

When configured as valve 100, the cam 120 is concentric about the inner slide 150. Returning to FIG. 2, when seals, such as seal 600 (not shown for ease of viewing and understanding), are arranged within each of the three grooves 122, 124, 126 and around the inner slide 150, the seals and grooves together may form first and second compartments 160, 162 between the cam 120 and the inner slide 150. For instance, a first seal 600 in groove 122 and a second seal in groove 124 may form compartment 160 between the cam 120 and the inner slide 150. The second seal 600 in groove 124 and a third seal 600 in groove 126 may for the compartment 162 between the cam 120 and the inner slide 150. Accordingly, when in the closed or locked configuration, the second seal within groove 154 prevents fluid from passing between the inlet 154 and the outlet 152 via the openings When the valve 100 is in the closed or locked configuration, the first compartment 160 may be in fluid communication with the first opening 352 in the inlet 154 and the second compartment 162 may be in fluid communication with the second opening 354 in the outlet 152. In this configuration, the seal within groove 124 may prevent fluid from passing between the first and second compartments. When the valve 100 is in the unlocked or open configuration, the second compartment 162 may be in fluid communication with both the first opening 352 and the second opening 354. In this configuration, fluid is able to pass from the inlet 154 to the outlet 152 by way of the second compartment 162.

Figure 7:
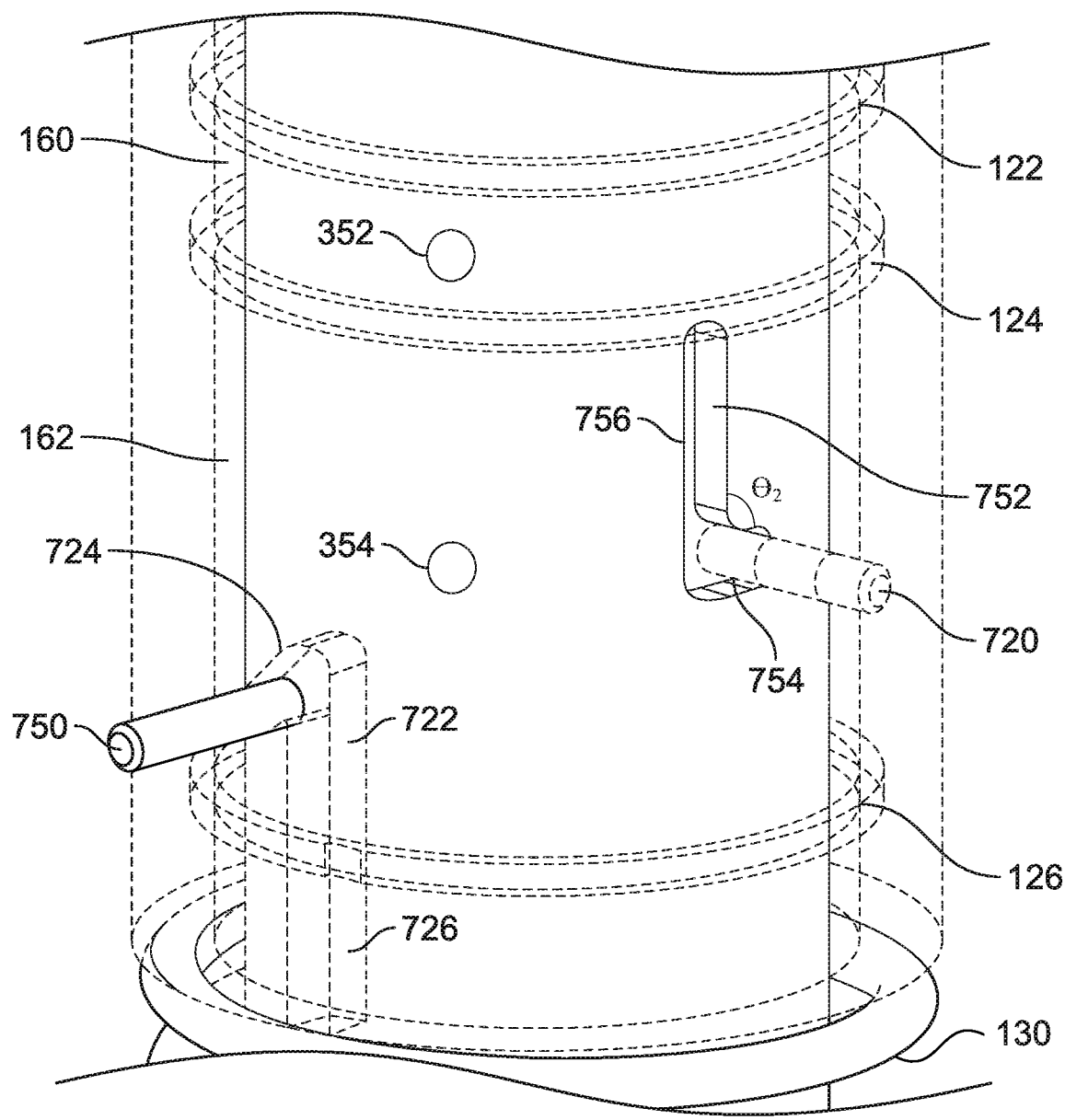
FIG. 7 is a partial perspective view of an overload protection valve in accordance with aspects of the disclosure.

FIG. 7 depicts the cam 120 and inner slide 150 when the valve is in the closed or locked configuration. As shown, each of the cam 120 and the inner slide 150 may include a respective pin 720, 750 and a respective slot 722, 752. For ease of viewing and understanding, the cam 120, cam pin 720, and slot 722 are shown as transparent (dashed line) and the seals 600 are not shown in FIG. 7. The slot 722 in the cam 120 may extend partially into (i.e. as a groove) or completely through (i.e. as a hole) the side wall 520 of the cam 120.

The cam pin 720 extends into the slot 752 of the inner slide, and the inner slide pin 750 extends into the slot 722 of the cam 120. Each of the pins may be sized (length and width) to be able to slide within the corresponding slots. For instance, cam pin 720 may be sized to slide within slot 752 of the inner slide 150, and inner slide pin 750 may be sized to slide within the slot 722 of the cam 120. In this regard, the shape of each slot defines the path of the corresponding pin in that slot. Each slot has a respective first slot portion 724, 754 and a respective second slot portion 726, 756. The first and second slot portions of each of the slots may be arranged at an angle $\theta_1$ (FIG. 5), $\theta_2$ (FIG. 7) relative to one another in a "check" (less than a 90 degree angle) or "L" (at or approximately a 90 degree angle) shape corresponding to a "check mark" or "L" shaped path for the corresponding pin in that slot.

During loading, when the grabbing mechanism 30 is attached to a load, such as object 40, and the moving mechanism 10 begins to attempt to move the object, the object will provide a pulling/resistance force at the outlet end of the inner slide 150. At the same time, moving mechanism 30 will provide a pulling force at the inlet end of the inner slide 150. This will cause the inner slide 150, including the shelf area 158, to move towards the object 40. As the inner slide 150 is pulled towards the object 40, the inner slide pin 750 may move within and follow the shape of the first slot portion 724 of the slot 722 of the cam 120.

The overload spring 140 may slow or limit this movement of the cam pin 720 within the slot 752 of the inner slide 150 depending upon the pulling/resistance force provided by the object 40. How much the overload spring 140 is able to limit this movement may be a direct result of the sizing or spring force constant of the overload spring. In other words, the sizing of the overload spring may define a load on the valve 100 which will cause the valve to open. For instance, if the pulling/resistance force provided by the object 40 is very small relative to the sizing of the overload spring 140, the overload spring 140 may completely prevent the inner slide pin 750 from moving within the first slot portion 724 of the slot 722 of the cam 120. As the pulling/resistance is increased relative to the sizing of the overload spring 140, the amount of movement of the inner slide pin 750 within and along the first slot portion 724 of the slot 722 of the cam 120 will increase.

Movement of the inner slide pin 750 within and along the first slot portion 724 of the slot 722 in combination with the shape of the first slot portion 724 of the slot 722 of the cam, may cause the cam 120 to rotate. Arrow 800 of FIG. 8A indicates the direction of the rotation of the cam 120. Again, for ease of viewing and understanding, the cam 120, cam pin 720, and slot 722 are shown as transparent (dashed line) and the seals 600 are not shown in FIG. 8A. This rotation of the cam 120 may cause the cam pin 720 to slide within first slot portion 754 of the slot 752 of the inner slide 150.

Figure 8B:
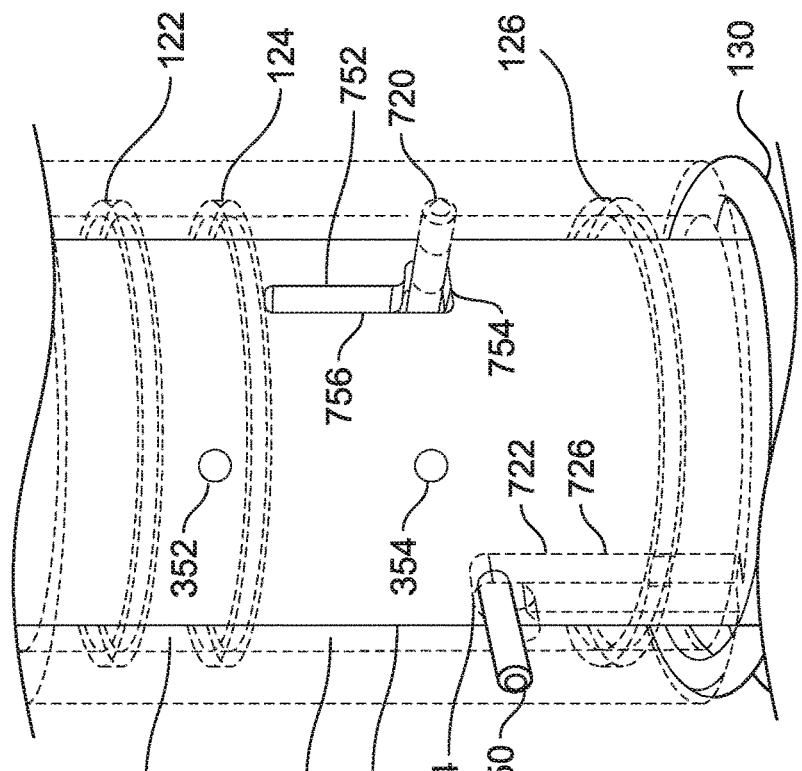
FIG. 8B is a partial perspective view of an overload protection valve in accordance with aspects of the disclosure.
Figure 8A:
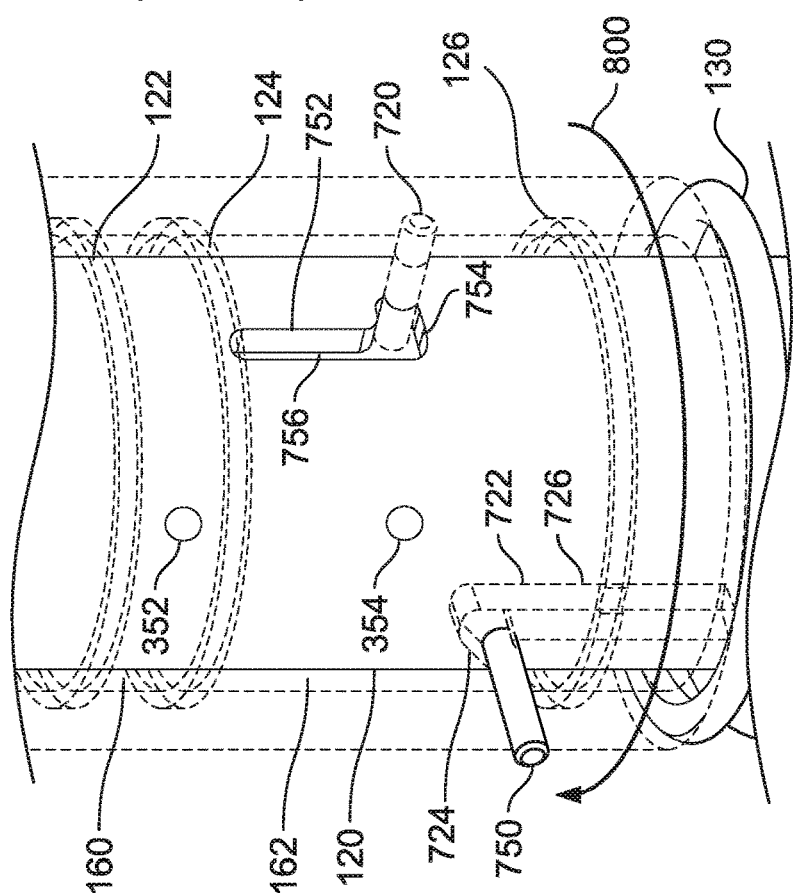
FIG. 8A is a partial perspective view of an overload protection valve in accordance with aspects of the disclosure.

Eventually, the cam pin 720 and inner slide pin 750 will align with the second slot portions 756, 726 of the slots 752, 722 of the inner slide 150 and cam 120, respectively, as shown in the example of FIG. 8B. Again, for ease of viewing and understanding, the cam 120, cam pin 720, and slot 722 are shown as transparent (dashed line) and the seals 600 are not shown in FIG. 8B.

Figure 9:
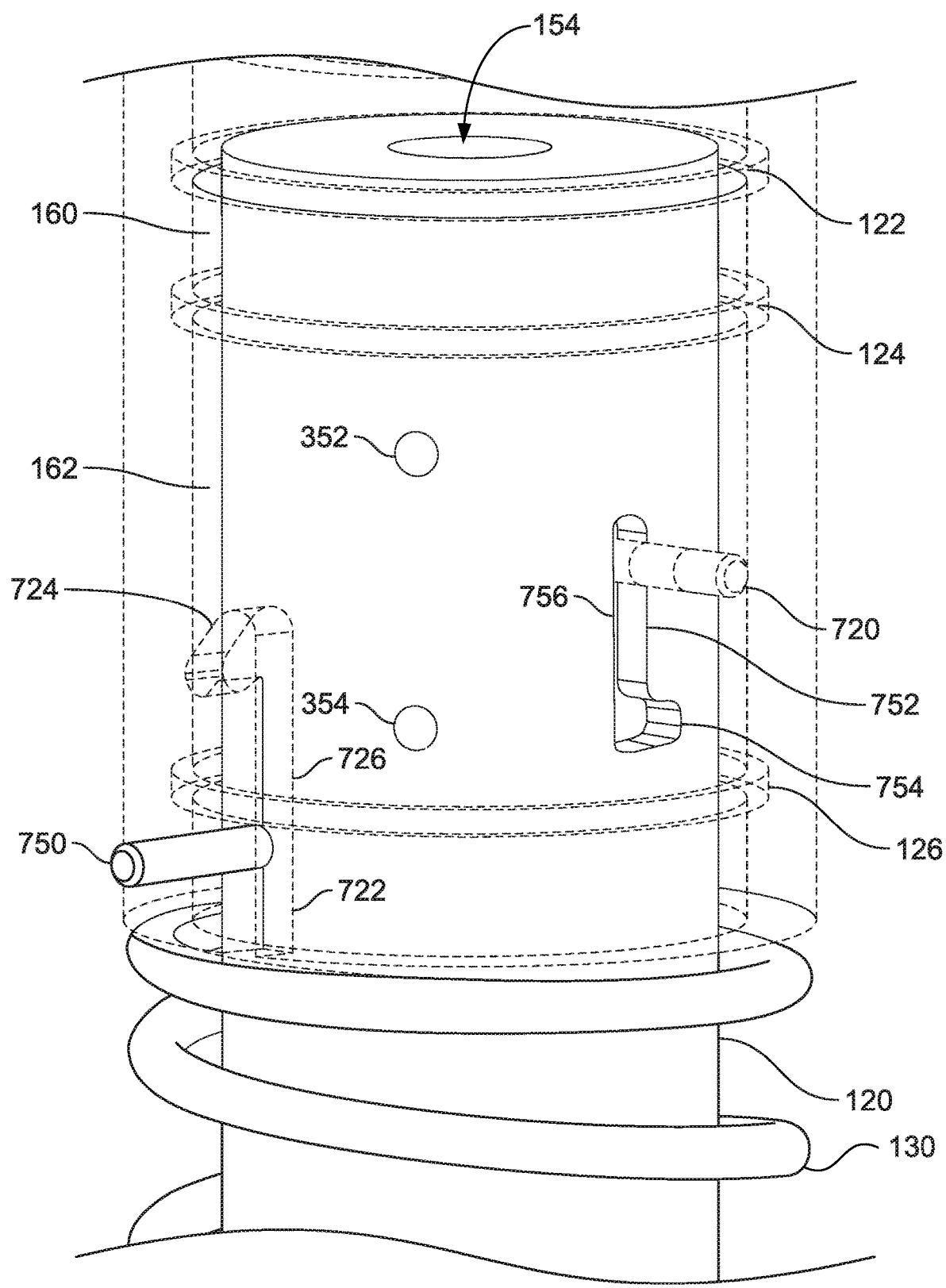
FIG. 9 is a partial perspective view of an overload protection valve in accordance with aspects of the disclosure.

At this point, the pulling/resistance of the object 40 will pull the inner slide pin 750 along the second slot portion 726 of the slot 722 of the cam 120 as shown in FIG. 9. Again, for ease of viewing and understanding, the cam 120, cam pin 720, and slot 722 are shown as transparent (dashed line) and the seals 600 are not shown in FIG. 9. At the same time, the cam actuation spring 130 will expand and push the cam 120 away from the shelf area 158 causing the cam pin 720 to move along the second slot portion 756 of the slot 752 of the inner slide 150.

Figure 10:
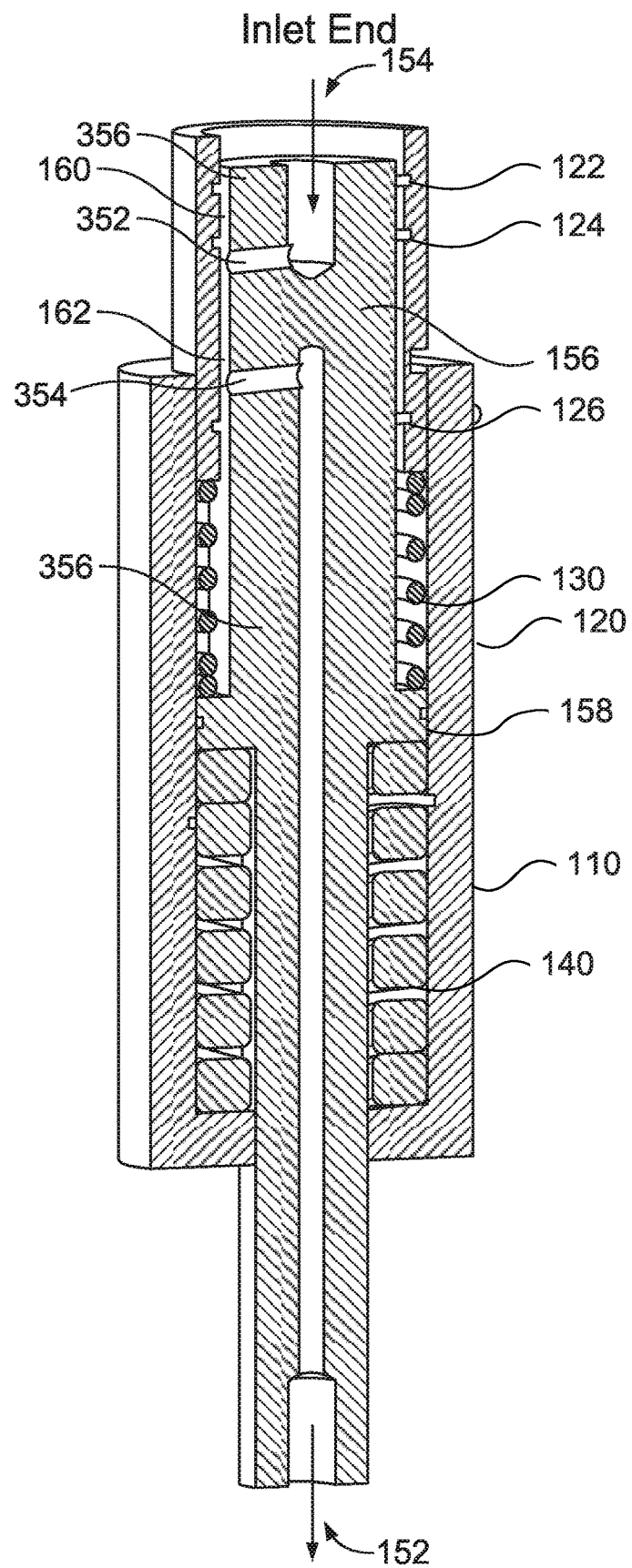
FIG. 10 is partial a cross-sectional view of an overload protection valve in accordance with aspects of the disclosure.

As can be seen from FIGS. 9 and 10, the movement of the cam away from the object will reposition the seals 600 and relative to the inner slide such that the first and second openings will each be within the second compartment thereby unlocking the valve and allowing fluid to pass from the inlet to the outlet. In this regard, FIG. 10 is a cross sectional view of the valve 100, again without the seals 600 for ease of viewing and understanding, with the valve in the open or unlocked configuration.

Figure 11:
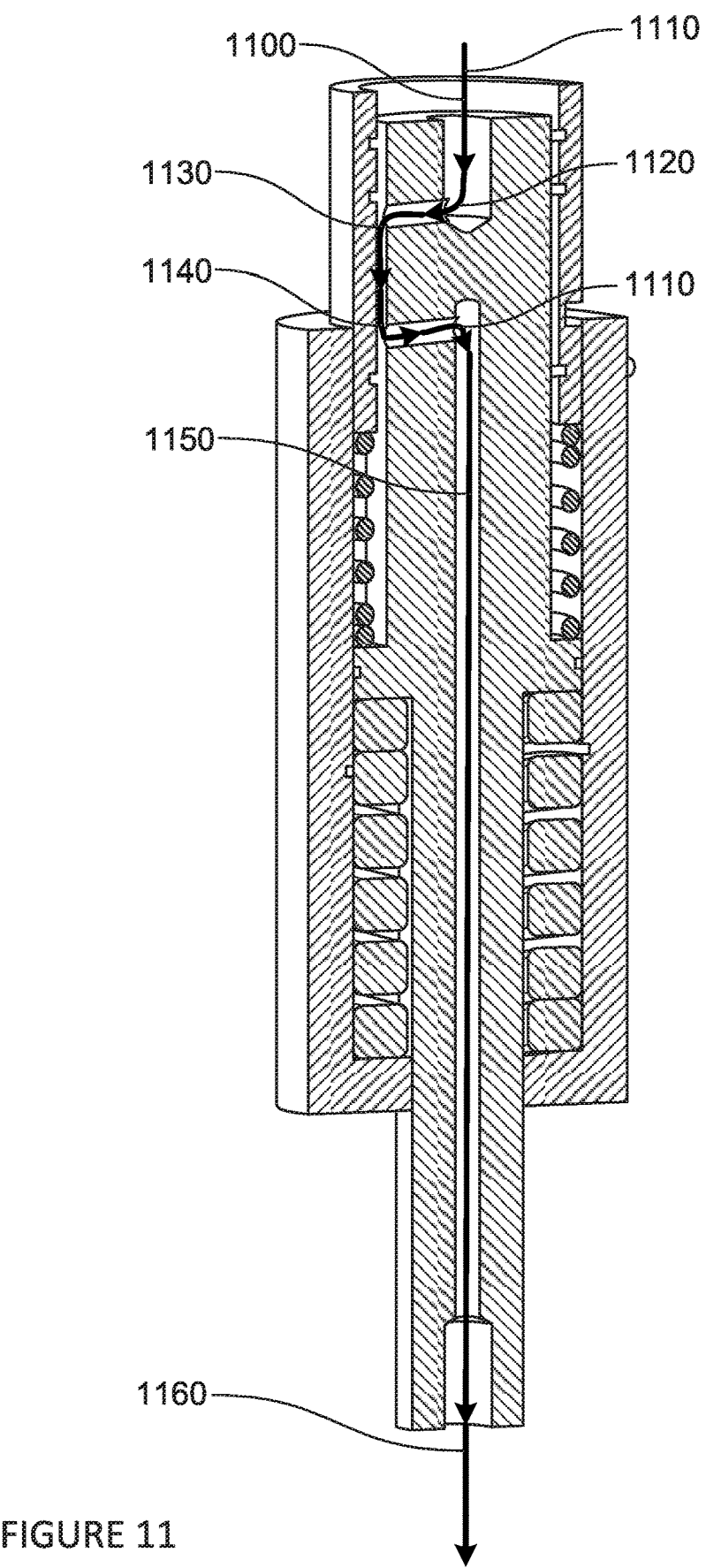
FIG. 11 is partial a cross-sectional view of an overload protection valve and fluid path in accordance with aspects of the disclosure.

In this configuration, fluid from the fluid source may then pass to the grabbing mechanism causing the grabbing mechanism to automatically release the object, pneumatically or hydraulically. FIG. 11 corresponds to the view of FIG. 10 highlighting an example path 1100 (including path portions 1110-1160) of fluid as it moves from the inlet end to the outlet end of the valve 100 when the valve is in the open or unlocked configuration. For instance, fluid from the pressurized fluid source 20 enters the inlet along path portion 1110, passes from the inlet into the inlet opening along path portion 1120, passes from the inlet opening into the second compartment along path portion 1130, passes from the second compartment into the outlet opening along path portion 1140, passes from the outlet opening into the outlet along path portion 1150, and passes to the grabbing mechanism 30 from the outlet along path portion 1160. Once the fluid reaches the grabbing mechanism 30, the fluid may cause the grabbing mechanism to automatically release the object 40, thereby allowing a fast release of the object, preventing an overload of system 1, and preventing damage to the system as well as any nearby objects or human operators.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising an overload protection valve, the valve including:
    an outer housing having an end wall;
    a cam arranged at least partially within the outer housing, wherein the cam includes a plurality of grooves on an interior surface of the cam;
    an inner slide including a side wall, a shelf area, an internal barrier, an inlet and an outlet, each of the inlet and outlet including an opening through the side wall, the inlet and the outlet being separated by the internal barrier; and
    an overload spring arranged between the end wall and the shelf area configured to define a load on the valve which will cause the valve to open, and wherein the cam is configured such that when the valve is closed, applying the load on the valve will cause the cam to rotate in order to allow the openings of the inlet and outlet to be in fluid communication with one another and open the valve.

2. The system of claim 1, further comprising a cam pin extending from an interior surface of the cam.

3. The system of claim 2, wherein the cam pin extends into a slot of the inner slide.

4. The system of claim 3, wherein the slot includes first and second slot portions arranged at an angle of 90 degrees or less from one another.

5. The system of claim 3, wherein the cam pin is configured to move within the slot of the inner slide when the defined load is attached to the overload protection valve.

6. The system of claim 1, further comprising an inner slide pin extending from an exterior surface of the inner slide.

7. The system of claim 6, wherein the inner slide pin extends into a slot of the cam.

8. The system of claim 7, wherein the inner slide pin is configured to move within the slot of the inner slide when the defined load is attached to the overload protection valve and causes the cam to rotate.

9. The system of claim 1, wherein each of the grooves includes a sealing O-ring.

10. The system of claim 9, wherein each sealing O-ring is arranged around the inner slide.

11. The system of claim 10, wherein a first pair of the sealing O-rings form a first compartment between the inner slide and the cam, and a second pair of the sealing O-rings forms a second compartment between the inner slide and the cam.

12. The system of claim 11, wherein the valve is closed the opening of the inlet is in fluid communication with the first compartment.

13. The system of claim 12, wherein the valve is closed the opening of the outlet is in fluid communication with the second compartment.

14. The system of claim 13, wherein when the valve is open, the openings of the inlet and the outlet are in fluid communication with the second compartment.

15. The system of claim 1, further comprising a cam actuation spring arranged around the inner slide and configured to provide a pushing force on the cam.

16. The system of claim 1, further comprising a pressurized fluid source configured to provide fluid to the overload protection valve.

17. The system of claim 16, further comprising a grabbing mechanism, wherein when the overload protection valve is open, the fluid is able to pass to the grabbing mechanism.

18. The system of claim 17, wherein the grabbing mechanism is configured to automatically release the defined load when the fluid passes to the grabbing mechanism.

19. The system of claim 1, further comprising the defined load.

* * * * *

UNITED STATES PATENT AND TRADEMARK OFFICE
CERTIFICATE OF CORRECTION

PATENT NO. : 10,794,513 B2  
APPLICATION NO. : 15/910198  
DATED : October 6, 2020  
INVENTOR(S) : Mathew Tabor Page 1 of 1

It is certified that error appears in the above-identified patent and that said Letters Patent is hereby corrected as shown below:

In the Claims

Column 9, Line 4 (Claim 12):  
Now reads "wherein the valve is"; should read -- wherein when the valve is --

Column 9, Line 7 (Claim 13):  
Now reads "wherein the valve is"; should read -- wherein when the valve is --

Signed and Sealed this  
Tenth Day of November, 2020

Andrei Iancu  
*Director of the United States Patent and Trademark Office*